Oct. 13, 1970    W. A. MORTON    3,533,612
STEEL MAKING APPARATUS INCLUDING SCRAP PREHEATER
Filed Dec. 28, 1966    3 Sheets-Sheet 1

INVENTOR.
William A. Morton
BY George R. Clark
his Attorney

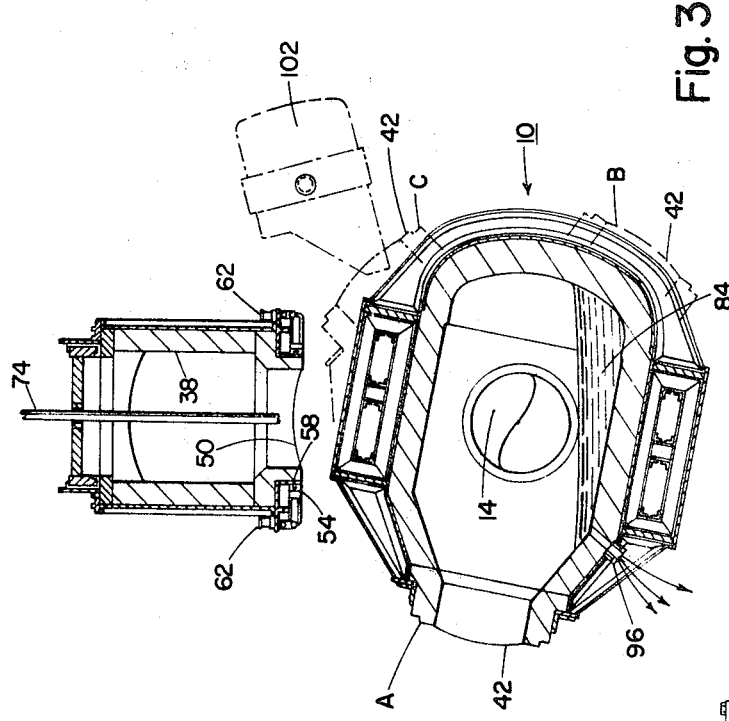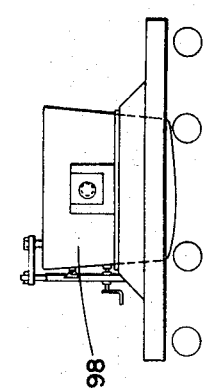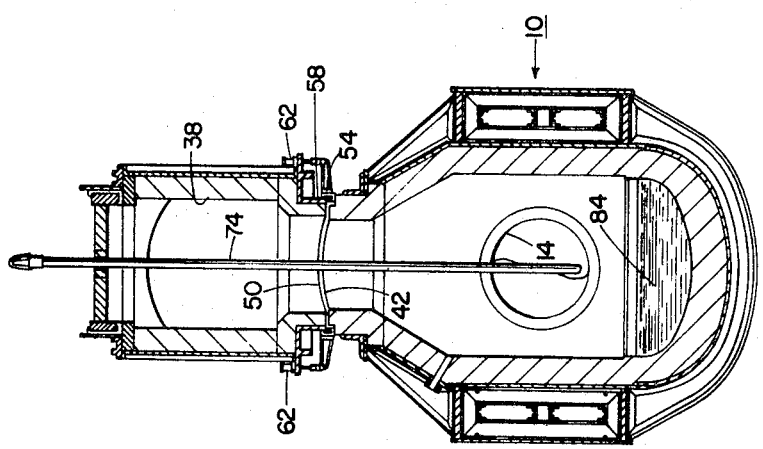

Oct. 13, 1970  W. A. MORTON  3,533,612

STEEL MAKING APPARATUS INCLUDING SCRAP PREHEATER

Filed Dec. 28, 1966  3 Sheets-Sheet 3

INVENTOR.
William A. Morton

BY
his attorney

United States Patent Office 3,533,612
Patented Oct. 13, 1970

3,533,612
STEEL MAKING APPARATUS INCLUDING
SCRAP PREHEATER
William A. Morton, Pittsburgh, Pa., assignor, by mesne assignments, to Sunbeam Corporation, a corporation of Illinois
Filed Dec. 28, 1966, Ser. No. 605,303
Int. Cl. C21c 5/50
U.S. Cl. 266—36                                  8 Claims

ABSTRACT OF THE DISCLOSURE

An apparatus for simultaneously refining steel by gaseous oxygen and preheating scrap metal for subsequent steel refining which utilizes the waste gases of the steel refining process. Two closely spaced, independently supported and independently rotatable BOF vessels are connected between adjacent walls of their generally cylindrical sections and have exhaust conduits which cooperate with the coupling means to selectively permit the waste gases from the refining vessel to flow into the other vessel for preheating the scrap before being exhausted.

---

This invention relates to the arrangement of two basic oxygen steel making furnaces (basic oxygen furnace hereinafter referred to as "BOF") which utilizes the waste gases from the refining process to preheat scrap materials.

The conventional BOF plant as constructed for the refining of molten iron to commercial steel employs two refractory lined vessels. In service, one vessel is operated until the lining loses its protective life. Then the second, or standby vessel, is placed in service. The vessel with the worn lining is repaired and then placed in a standby status.

The basic oxygen process for making steel is a batch process. A charge of molten iron and cold scrap is placed into an open-mouthed vessel. A vertically movable water-cooled lance is positioned above the molten bath and a jet of oxygen is directed through the lance into the molten metal under super atmospheric pressure. In the presence of a slag, the oxygen combines with the oxidizable impurities in the molten iron, e.g. carbon and silicon, and steel is produced. The customary practice is to use 70% molten blast furnace iron and 30% scrap steel as a charge for each heat. Scrap is cheaper than molten metal because of its great surplus on the market.

The usual mixture of 70% molten iron charged at about 2500° F. will, because of the exothermic nature of the oxidation reaction caused by the injection of oxygen, cause the 30% of cold scrap and the molten iron to reach the desired end pouring temperature of about 2950° F. If it is desired to utilize substantially more than 30% scrap, the scrap must be preheated or the molten iron must be delivered with more sensible heat plus a higher carbon and silicon content. If the single vessel commercial plant is used to preheat scrap prior to each heat, the time required to preheat is lost and production diminishes accordingly. In practice, therefore, the quantity of scrap which can be used as a coolant in the BOF process depends upon the analysis and temperature of the molten iron. While the latter appears to be an acceptable alternative it is difficult to alter the analysis and temperature of the molten iron after it is tapped from the blast furnace, and even if desired to do so the cost would be prohibitive.

In the BOF process, oxygen impinges on the surface of the molten bath and combustible gases, which are predominantly carbon monoxide (CO), are evolved as the products of the reaction of oxygen with the impurities in the bath. In conventional plants, these combustible gases were simply released to the atmosphere through the opening in the top of the vessel. As a result, the actual and potential heat energy contained in these gaseous products was wasted.

The conventional BOF practice and the materials or metal mix in common use was described above. Now an apparatus which uses the CO and hot fume evolved from the bath together with additional fuel to preheat scrap and thereby increase the percentage of this lower cost material that can be used in the process will be described.

I provide an apparatus for refining steel by gaseous oxygen and simultaneously preheating scrap metal for subsequent steel refining by utilizing the waste gases of the steel refining process which comprises a pair of vessels each having a mouth at the top, means atmospherically coupling the vessels below their mouths and permitting each vessel to rotate so as to tilt, means permitting waste gases of both vessels to selectively escape from one of the mouths of the vessels, means supporting each of the vessels independently, and means rotating each of the vessels independently during the charging and pouring operations.

I preferably provide that the means permitting the waste gases of both vessels to selectively escape comprises a pair of conduits aligned in proximity with the mouths of the vessels, a pair of seal rings each surrounding the proximate coupling between the conduit and the mouth of the vessel, means removing the seal rings when one of the vessels is rotated so as to tilt away from the conduit, a common exhaust means for waste gases to which the other ends of the pair of conduits are coupled, and means opening and closing each conduit coupling to the common exhaust means.

I preferably provide that the means atmospherically coupling the vessels comprises a pair of ducts each extending from one of the vessels and coming in close proximity to each other at their opposite ends.

I provide a method of preheating metal scrap prior to the refining of a charge of steel containing the scrap which comprises charging a first vessel with scrap materials, charing a second vessel of preheated scrap with molten iron, directing oxygen at superatmospheric pressure into the second vessel creating combustible and non-combustible gases, and directing the flow of the waste gases from the second vessel into the first vessel whereby the scrap is preheated.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which:

FIG. 2 is a transverse section taken on line II—II of FIG. 1;

FIG. 3 is a view similar to FIG. 2 but shown in the metal pouring position;

Figure 1:
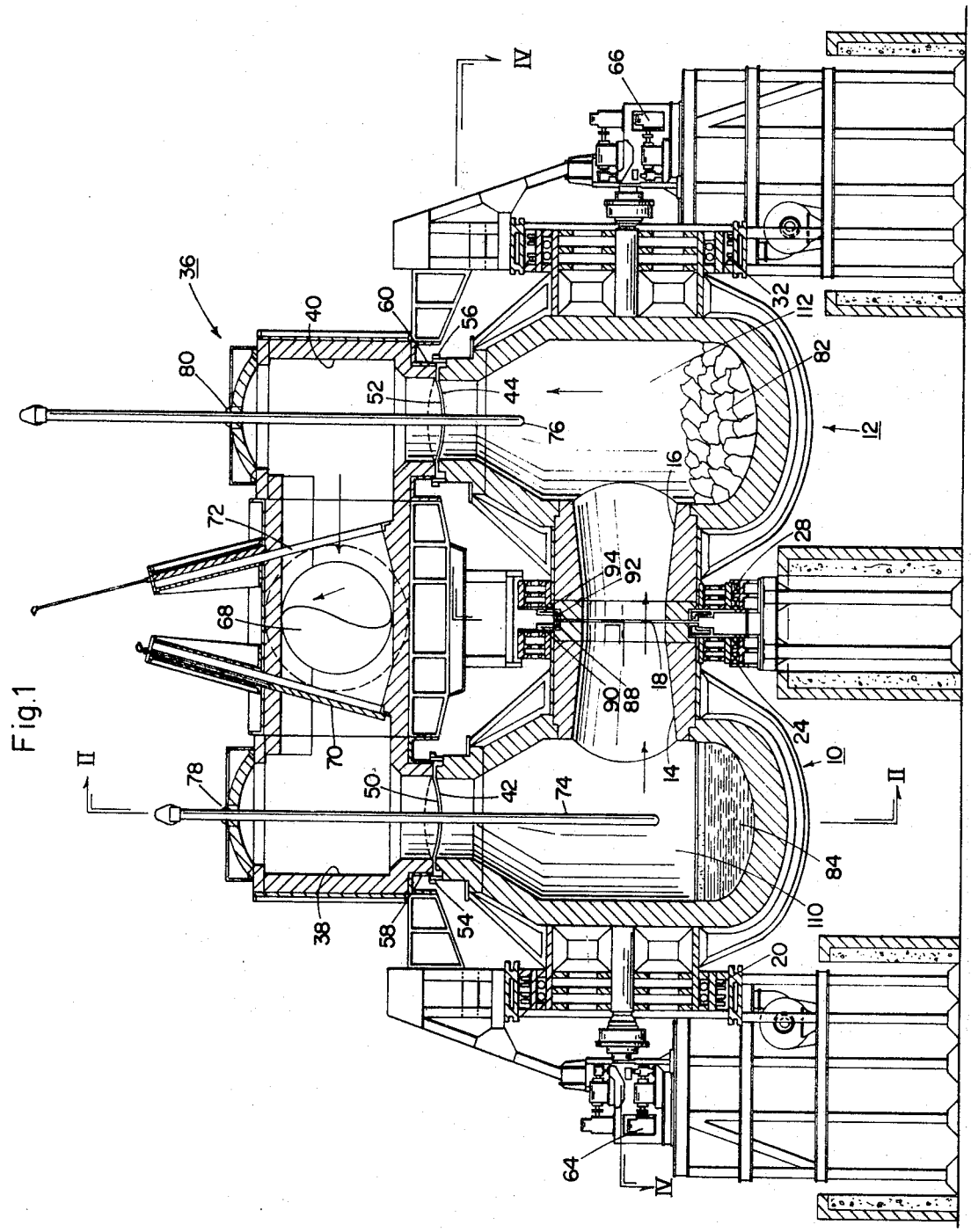
FIG. 1 is a longitudinal sectional view of a cooperating pair of BOF vessels.
Figure 4:
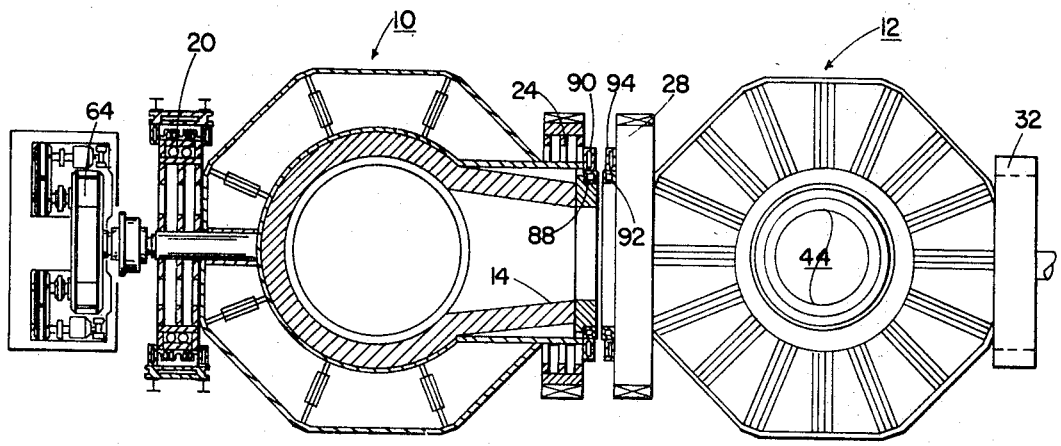
FIG. 4 is a top plan view of FIG. 1 having the left hand BOF in section and taken generally on line IV—IV of FIG. 1.

Referring specifically to the drawings, the vessels 10 and 12 having inner chambers 110 and 112 respectively are assembled in cooperating pairs. Each of the vessels has an aperture in its generally cylindrical section. Refractory lined ducts 14 and 16 connect the vessels atmospherically to each other at the apertures. An expansion space 18 is provided to permit independent rotation of each vessel 10 and 12. The vessels 10 and 12 are supported by bearing assemblies 20, 24, 28 and 32. Bearing assemblies 24 and 28 are spaced at a sufficient distance from the ducts 14 and 16 to insure that they are not exposed to excessive heat from expansion space 18. Also water-cooled rings 88, 90, 92 and 94 protect bearings 24 and 28.

A waste gas system generally designated 36 is arranged above the vessels 10 and 12 to alternately or selectively remove waste gases from one of the vessels 10 or 12 designated to hold the scrap. Conduits 38 and 40 are aligned with mouths 42 and 44 of vessels 10 and 12, respectively. The mouths 42 and 44 of each vessel 10 and 12 and the bottom edges 50 and 52 of each conduit 38 and 40 has cooperating concave-convex surfaces to permit tilting of each vessel 10 and 12. Water-cooled movable seal rings 54 and 56 embrace the couplings between conduits 38 and 40 and mouths 42 and 44. Rings 54 and 56 can be moved upward along collars 58 and 60 of conduits 38 and 40 respectively to permit tilting of each vessel 10 and 12. Movement of the rings 54 and 56 is accomplished hydraulically through fittings 62 shown in FIGS. 2 and 3 which are adapted to receive a hydraulic line. The hydraulic system is not shown.

Conduits 38 and 40 are joined to a common chimney or fume exhauster 68. Directional control of gases within the vessels 10 and 12 is accomplished by valves 70 and 72. In FIG. 1 the valve or damper 70 is closed and valve or damper 72 is opened causing gases to circulate as shown by the arrows.

Oxygen is introduced into vessels 10 and 12 through water-cooled lances 74 and 76. Lances 74 and 76 are centrally disposed within each vessel 10 and 12 and retractable through openings 78 and 80 of conduits 38 and 40 respectively.

The new apparatus will comprise a plant having a minimum of four vessels, two operating and two held in reserve to insure continuous batch production. In operation, one vessel (assume 12) receives a charge of scrap 82 to be preheated, while the second vessel 10 refines a heat, comprising a previous charge of preheated scrap and molten metal together with calcium, with oxygen delivered through lance 74 under super atmospheric pressure to the mixture of molten metal and scrap 84. In the refining vessel 10, carbon monoxide gas and hot fume evolve from the molten bath 84. Since valve 70 is closed, the CO and high temperature fume are conveyed through ducts 14 and 16 to preheating vessel 12. The CO is burned in vessel 12 containing the scrap 82 by directing oxygen downwardly at super atmospheric pressures from lance 76 into the gas stream. It is anticipated that the scrap 82 may be preheated to 1800° F. or higher by this combustion depending upon the amount of scrap 82 present. Supplementary fuel may be introduced into vessel 12 to increase the quantity of scrap 82 preheated and to insure completion of this phase with timed regularity and at the desired temperature. The fume and products of combustion from vessel 12 then pass into conduit 40, through valve 72, and into chimney or exhaust 68.

While the preheating is taking place in vessel 12, vessel 10 may be rotated independently of vessel 12 by drive mechanism 64. After the molten steel 84 is tapped and the slag is removed, a charge of cold scrap is placed into vessel 10 which is then rotated to the upright position. This sequence is shown in FIGS. 2 and 3. FIG. 2 shows vessel 10 in the normal position. FIG. 3 shows vessel 10 in the steel pouring position designated A pouring molten steel 84 through port 96 into steel ladle car 98. The vessel is then rotated in the opposite direction to the slag pouring position designated B and slag is poured out of the charging position designated C where it is charged with mouth 42 shown in chain line into slag ladle car 100. The vessel then is rotated in the opposite direction to the scrap through mouth 42 by ladle 102. Vessel 12 is then rotated independently of vessel 10 by drive mechanism 66 for the purpose of receiving a charge of molten pig iron. Vessel 12 is rotated to the upright position and the refining process is begun therein. Valve 72 is closed and valve 70 is opened thereby permitting the combustible gases evolved in vessel 12 to pass into vessel 10 and reverse the previous direction. In this fashion, the continuity of the steel-making process is maintained.

Figure 5:
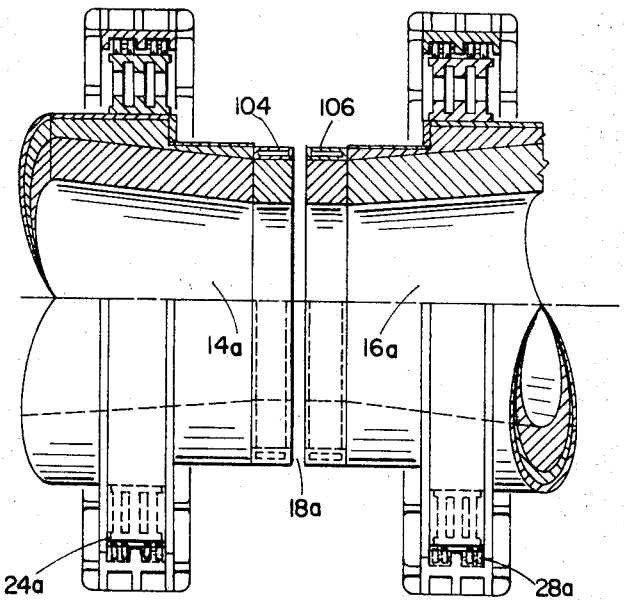
FIG. 5 is an enlarged view of a second embodiment for the seal and bearings between the furnaces.

FIG. 5 (like parts in previous figures have suffix $a$ added to the numerals) shows another embodiment of the position of the bearings 24$a$ and 28$a$ removed from space or expansion joint 18$a$ to protect against excessive heat. Water-cooled rings 104 and 106 help to protect the bearings.

Conventional BOF's use approximately 30% scrap and 70% molten iron. The cost of producing a ton of steel using this scrap-iron ratio is of the order of $50.00, assuming molten iron at $35.00 per ton and scrap at $26.00 per ton. The proposal is to use 40, 50 or 60% scrap by preheating the scrap to such temperature that the several exothermic reactions plus sensible heat in the molten iron and scrap will produce heats at desired casting temperatures and rates. In such a system, which can employ higher percentages of scrap than the normal BOF and can make gains by utilizing waste combustibles and heated gases for preheating scrap, without sacrificing production time for preheating scrap, the cost of producing a ton of steel may be substantially reduced when the cost of scrap favors the use of more scrap rather than hot metal; and in certain cases where insufficient hot blast furnace iron is available the system can continue to operate economically.

The cooperative dual vessel process with its scrap preheating function has the advantages of creating a metal mix, prior to refining, of higher thermal values and lower material cost by virtue of the relative cost of metallics; using, rather than wasting the gases evolved in the refining process; and, by the use of supplementary fuel prior to blowing with oxygen, raising over-all efficiency of a basic oxygen process in terms of production and cost. By preheating the scrap, the approach to the ultimate pouring temperature is advanced prior to the refining step. Therefore, the time of the heats will be more uniform than in a refining vessel where greater quantities of heat must be added. Preheating also increases the quantity of sensible heat in the charge and therefore the time required for all reactions is reduced. The corresponding increase in productivity more than offsets the higher capital investment required for the dual vessel plant.

While I have shown and described a present preferred embodiment and have illustrated a present preferred method of practicing the same, it is to be distinctly understood that the invention is not limited thereto but may be otherwise variously embodied and practiced within the scope of the following claims.

I claim:
1. An apparatus for refining steel by gaseous oxygen and simultaneously preheating scrap metal for subsequent steel refining by utilizing the waste gases of the steel refining process which comprises:
 (a) a pair of basic oxygen furnace vessels each having a concave bottom, a generally cylindrical section having an aperture and a truncated conical section terminating in a circular, centrally disposed, reduced opening at the top;
 (b) vertically movable oxygen lance means which may be selectively positioned in said openings for delivering oxygen to the molten metal contained in said vessels during refining;
 (c) gas duct means connected between the apertures of adjacent walls of said generally cylindrical sections of said vessels and generally perpendicular to the axes of said sections, thereby providing for the flow between said vessels of the waste gases result- ing from the oxidation of impurities during the refining of said molten metal and permitting each vessel to rotate so as to tilt;

(d) exhaust means communicable with said openings permitting waste gases of both vessels to selectively escape from one of the vessels to circulate the waste gases produced in one of said vessels during refining into the other of said vessels to preheat scrap contained in said other vessel;

(e) means independently rotatably supporting each of the vessels in closely spaced relationship; and (f) means rotating each of the vessels independently into a position for receiving raw material through said opening during the charging operation, a position in which said opening will be in gas communication with said exhaust means during the refining and preheating operations, and a position for pouring the refined metal during the pouring operation.

2. An apparatus as recited in claim 1 wherein the gas duct means comprises a pair of ducts each connected at one end with the generally cylindrical section of one of said vessels and having their respective free ends closely adjacent each other, each of said ducts being on the same axis and independently rotatably supported.

3. An apparatus as recited in claim 2 wherein one side of each of the vessels is supported by the duct which is supported by bearing assemblies spaced from said free end such that the vessels rotate independently about the axis of the ducts.

4. An apparatus as recited in claim 1 wherein the exhaust means permitting the waste gases of both vessels to selectively escape comprises:

(a) a pair of conduits each having one end aligned in proximity to the opening of one of the vessels;

(b) a pair of vertically movable seal rings each surrounding the proximate coupling between the conduit and the mouth of the vessel;

(c) means vertically removing the seal rings when one of the vessels is rotated so as to tilt away from the conduit;

(d) a common fume exhauster for waste gases to which the other ends of the pair of conduits are coupled; and (e) means opening and closing each conduit coupling to the common fume exhauster.

5. An apparatus as recited in claim 4 wherein each seal ring is vertically movable upwardly toward the conduit by lifting means connected to each seal ring to permit tilting of the vessel out of gas communication with the exhaust means for charging and pouring.

6. An apparatus as recited in claim 4 wherein the wall defining the opening of each vessel and the wall of the aligned conduit have cooperating concave-convex surfaces to permit tilting of the vessel out of gas communication with the exhaust means for charging and pouring.

7. An apparatus as recited in claim 1 wherein an oxygen lance is vertically disposed through the exhaust means above each of said vessels and into the opening of the vessels in a lowermost position during refining to oxidize the impurities in the molten metal, retractable to an intermediate position during the preheating to burn the waste gases resulting from the refining and retractable out of the vessel opening to permit tilting of the vessel out of gas communication with the exhaust means for charging and pouring.

8. An apparatus for refining steel by gaseous oxygen and simultaneously preheating scrap metal for subsequent steel refining by utilizing the waste gases of the steel refining process which comprises:

(a) a pair of vessels each having a mouth at the top and a retractable lance extending into each vessel through which gaseous oxygen is imparted into the vessel;

(b) a pair of ducts each extending from one of the vessels and coming in close proximity to each other at their opposite ends whereby gases can flow from one vessel to the other and whereby each vessel is free to rotate so as to tilt independently of the other;

(c) a pair of conduits aligned in proximity with the mouths of the vessels, a pair of seal rings each surrounding the proximate coupling between the conduit and the mouth of the vessel, means connected to each seal ring movable upward toward the conduit, means lifting the means connected to each seal ring so that the seal ring is raised allowing the vessel to rotate so as to tilt away from the conduit, a common exhaust means for waste gases to which the other ends of the pair of conduits are coupled, means opening and closing each conduit to the common exhaust means;

(d) means supporting each of the vessels independently; and (e) means rotating each of the vessels independently during the charging and pouring operations.

References Cited
UNITED STATES PATENTS

| | | | |
|---|---|---|---|
| 2,771,290 | 11/1956 | Tinker | 266—31 |
| 2,940,744 | 6/1960 | Swenson | 266—18 |
| 3,231,369 | 1/1966 | Görlich et al. | 75—60 |
| 3,301,664 | 1/1967 | Hall | 75—60 |
| 3,309,193 | 3/1967 | Bartu | 75—60 X |

J. SPENCER OVERHOLSER, Primary Examiner